US009616401B2

(12) United States Patent
Sakaniwa et al.

(10) Patent No.: US 9,616,401 B2
(45) Date of Patent: Apr. 11, 2017

(54) CEMENT PRODUCTION APPARATUS

(71) Applicant: MITSUBISHI MATERIALS CORPORATION, Chiyoda-ku (JP)

(72) Inventors: Daisuke Sakaniwa, Naka (JP); Yoshinori Takayama, Naka (JP); Junzhu Wang, Naka (JP); Hirokazu Shima, Naka (JP)

(73) Assignee: MITSUBISHI MATERIALS CORPORATION, Chiyoda-ku (JP)

( * ) Notice: Subject to any disclaimer, the term of this patent is extended or adjusted under 35 U.S.C. 154(b) by 216 days.

(21) Appl. No.: 14/382,939

(22) PCT Filed: Mar. 13, 2013

(86) PCT No.: PCT/JP2013/056981
§ 371 (c)(1),
(2) Date: Sep. 4, 2014

(87) PCT Pub. No.: WO2013/137305
PCT Pub. Date: Sep. 19, 2013

(65) Prior Publication Data
US 2015/0049572 A1 Feb. 19, 2015

(30) Foreign Application Priority Data

Mar. 14, 2012 (JP) .................. 2012-057518

(51) Int. Cl.
*B01F 15/06* (2006.01)
*C04B 7/43* (2006.01)
(Continued)

(52) U.S. Cl.
CPC .............. *B01F 15/06* (2013.01); *B01F 15/04* (2013.01); *C04B 7/43* (2013.01); *F27B 7/20* (2013.01);
(Continued)

(58) Field of Classification Search
CPC ...... E01C 19/1009; E01C 19/10; B01F 15/06; C04B 7/43
(Continued)

(56) References Cited

U.S. PATENT DOCUMENTS 4,063,875 A   12/1977  Takeuchi
4,191,526 A *  3/1980  Triebel .................... C04B 7/432
                                                      432/106

FOREIGN PATENT DOCUMENTS

JP    62 29919    7/1987
JP    6 191615    7/1994
(Continued)

OTHER PUBLICATIONS

U.S. Appl. No. 14/383,274, filed Sep. 5, 2014, Sakaniwa, et al.
(Continued)

*Primary Examiner* — Tony G Soohoo
*Assistant Examiner* — Anshu Bhatia
(74) *Attorney, Agent, or Firm* — Oblon, McClelland, Maier & Neustadt, L.L.P.

(57) ABSTRACT

A cement production apparatus having: a duct 21 in which exhaust gas drained from a lower cyclone flows upward, distributes and introduces the exhaust gas to upper cyclones; material-supplying pipes 22 for supplying cement raw material connected to both side parts of one side surface of the duct 21 below a distribution part 23 among the upper cyclones; and a supply-amount controller 26 provided on an upstream position above the material-supplying pipes 22 for controlling supply-amounts of the cement raw material to the material-supplying pipes 22: and when H is a vertical distance between a horizontal surface P1 passing through centers of distribution outlets 21a of the upper cyclones and a horizontal surface P2 passing through centers of connect-
(Continued)

ing ports 22*a* of the material-supplying pipes 22, and D is a diameter of the duct 21, a ratio H/D is set to 1.4 to 2.5.

8 Claims, 5 Drawing Sheets

(51) Int. Cl.
*F27B 7/20* (2006.01)
*B01F 15/04* (2006.01)

(52) U.S. Cl.
CPC ...... *F27B 7/2041* (2013.01); *B01F 2015/062* (2013.01); *B01F 2215/0047* (2013.01); *Y02P 40/121* (2015.11)

(58) Field of Classification Search
USPC .......................................................... 366/23
See application file for complete search history.

(56) References Cited

FOREIGN PATENT DOCUMENTS

| JP | 8 119694 | 5/1996 |
|----|----------|--------|
| JP | 9 262452 | 10/1997 |
| JP | 2012 214309 | 11/2012 |

OTHER PUBLICATIONS

U.S. Appl. No. 14/417,276, filed Jan. 26, 2015, Sakaniwa, et al.
International Search Report Issued Jun. 18, 2013 in PCT/JP13/56981 Filed Mar. 13, 2013.
Extended European Search Report issued Oct. 14, 2015 in Patent Application No. 13761163.8.

\* cited by examiner

CEMENT PRODUCTION APPARATUS

BACKGROUND OF THE INVENTION

Field of the Invention

The present invention relates to an apparatus of producing cement clinker by burning cement raw material in a kiln while supplying to a preheater.

Priority is claimed on Japanese Patent Application No. 2012-57518, filed Mar. 14, 2012, the content of which is incorporated herein by reference.

Description of the Related Art

In a cement production apparatus, a preheater is provided for pre-heating cement raw material. The preheater is configured by a plurality of cyclones connected in a vertical direction in which a lowest cyclone is connected to a kiln inlet part of a cement kiln. The cement raw material is pulverized by a mill, and then is supplied to the preheater from a duct connecting a top cyclone and a lower cyclone at a middle position of the preheater. In the preheater, the cement raw material is introduced into the top cyclone being carried by exhaust gas rising from the cement kiln, then is preheated by a heat of the exhaust gas while going down in each of the cyclones sequentially, and finally supplied to the cement kiln from a lowermost cyclone.

When the cement raw material is supplied to the duct, since the plurality of cyclones are arranged above the duct, it is necessary to supply the material equally in order to pre-heat equally in the cyclones.

As an apparatus which supplies powder such as the cement raw material, there are apparatuses described in Patent Document 1 to Patent Document 3 in which improvement of dispersibility is contrived.

In an apparatus described in Patent Document 1, on an upper surface of a lower-end part of a bottom plate of a material-supplying pipe (i.e., an inclined chute) supplying powder of cement raw material, a mountain-shape protruded part protruding as a probability curve is formed. The protruded part is formed so that a highest part is at a lower-end side and a height at an upper-stream side is zero, so that the material is supplied into a duct being divided to left-and-right by hitting against the protruded part.

In Patent Document 2, a dispersing device of powder material is proposed in which a dispersing plate is provided at a connecting part between a material-supplying pipe (i.e., a charge chute) and a duct (i.e., a duct) so as to be protruded to a half of an inner diameter of the charge chute at a maximum by angular-displacement around a horizontal axis. In Patent Document 3, a device in which a material-slide surface is formed in substantially orthogonal direction to a gas flow at a connecting part between a material-supplying pipe (i.e., a material chute) and a duct (i.e., a heated-gas duct) is disclosed.

In the devices disclosed in Patent Documents 2 or 3, the material is supplied with being dispersed into the duct by hitting against the dispersing plate protruding in the duct or the material-slide surface.

PRIOR ART DOCUMENT

Patent Document

Patent Document 1: Japanese Unexamined Patent Application, First Publication No. H06-191615
Patent Document 2: Japanese Unexamined Patent Application, First Publication No. H09-262452
Patent Document 3: Japanese Examined Utility Model (Registration) Application, Publication No. S62-29919

SUMMARY OF THE INVENTION

Problems to be Solved by the Invention

However, in those devices of Patent Documents, since the protruded part or the dispersing plate are arranged for dispersion at the lower end part of the material-supplying pipe or in the duct, it is tend to cause occurring of choking or the like. Moreover, when the dispersing plate is arranged in the duct, the dispersing plate may become resistance to a flow of the exhaust gas rising from below so that a stable operation may be obstructed.

The present invention is achieved in consideration of the above circumstances, and has an object to provide a cement production apparatus in which heat-exchanging efficiency can be improved by even pre-heating material supplied to cyclones above a duct and which can perform an operation with low pressure loss and small energy consumption.

Means for Solving the Problem

In a duct of a cement production apparatus, exhaust gas from a lower cyclone rises as a swirl flow. If a plurality of distribution outlets among upper cyclones are provided, in the duct, the swirl flows of the exhaust gas are generated according to a number of the distribution outlets. Therefore, as a conventional device, if the material-supplying pipe is one and a connecting port to the duct of the material-supplying pipe is provided so as to be flush with an inner wall surface of the duct, most of the cement raw material flowing into the duct from the material-supplying pipe is drained from the distribution outlets at an upper part of the duct with the swirl flow near the connecting port of the material-supplying pipe among the swirl flows of the exhaust gas. Accordingly, amounts of the cement raw material at the distribution outlets arranged at the upper part of the duct are biased and not even. In this case, temperature difference between the exhaust gases at the distribution outlets is large; and the heat-exchange efficiency is deteriorated.

As in Patent Document 2, even if the dispersing plate is arranged blow the connecting port of the material-supplying pipe, most of the cement raw material is carried by the swirl flow near the inner wall of the duct and drained from one of the distribution outlets if the dispersing plate is provided not to have an enough length to be inserted into the duct.

Therefore, the present invention achieved a solution as below.

A cement production apparatus according to the present invention includes: a plurality of cyclones vertically connected to each other in which exhaust gas generated in a cement kiln flows; a duct provided between the two upper cyclones and the lower cyclone being arranged below the upper cyclones, the duct in which the exhaust gas drained from the lower cyclone flows upward, distributing and introducing the exhaust gas to the upper cyclones; material-supplying pipes for supplying cement raw material connected to both side parts of a side surface of the duct below a distribution part among the upper cyclones; and a supply-amount controller provided on an upstream position above the material-supplying pipes for controlling supply-amounts of the cement raw material to the material-supplying pipes: and when H is a vertical distance between a horizontal surface passing through centers of distribution outlets of the upper cyclones and a horizontal surface passing through centers of connecting ports of the material-supplying pipes, and D is a diameter of the duct, a ratio H/D is set to 1.4 to 2.5.

In the horizontal surface passing through the centers of the connecting ports of the material-supplying pipes in which the ratio H/D is set to 1.4 to 2.5, when seeing from above the duct, the flow of the exhaust gas flowing out to the distribution outlets of the upper cyclones forms symmetrical swirl flows by 180° at a center part of the duct. Therefore, with dividing the material-supplying pipe into two, and placing the connecting ports of the material-supplying pipes on the positions corresponding to the swirl flows appearing in the duct, so that the cement raw material can be flown out equally to the distribution outlets and pre-heated uniformly. However, if the connecting ports of the material-supplying pipes are provided symmetrically by 180° in order to arrange the connecting ports at the positions corresponding to the swirl flows, it is complicated to arrange the material-supplying pipes. Moreover, it is not easy to install the apparatus since the apparatus would be enlarged.

Accordingly, as in the cement production apparatus (corresponding to a first embodiment in DETAILED DESCRIPTION OF THE INVENTION stated below) according to the present invention, by providing the connecting ports of the material-supplying pipes on both the side parts of the side surface of the duct, the material-supplying pipes can be arranged from the one side of the duct, so that it is easy to lay the material-supplying pipes. In this case, by providing the connecting ports of the material-supplying pipes on both the side parts of the side surface of the duct, the connecting ports of the material-supplying pipes are arranged so as to be separated maximally from each other at the one side surface of the duct. As a result, the connecting ports of the material-supplying pipes can be arranged at positions corresponding to the two swirl flows appearing in the duct.

On the upstream position above the material-supplying pipes, the supply-amount controller for controlling the supply-amounts of the cement raw material is provided, so that deviation of the material supply-amounts can be calibrated by the supply-amount controller. Accordingly, the supply-amounts of the cement raw material supplied to the material-supplying pipes can be controlled and distributed to the material-supplying pipes. Therefore, the cement raw material can be supplied to the respective swirl flows with controlling so that temperatures of the distribution outlets are equalized and the pre-heating can be equalized. As a result, heat-exchanging efficiency between the exhaust gas and the cement raw material can be improved. Moreover, since it is not necessary to provide dispersing plates and the like in the duct, it is possible to perform an operation with low pressure loss and small energy consumption.

If the ratio H/D is too small, it is not desirable because dispersibility of material is deteriorated since the connecting ports of the material-supplying pipes approach a distribution part to the upper cyclones. If the ratio H/D is too large, the heat-exchanging efficiency between the exhaust gas and the material is deteriorated since the cement raw material supplied from the material-supplying pipes is dropped to the lower cyclone. Therefore, it is preferable to set the ratio H/D in a range of 1.4 to 2.5.

In the cement production apparatus according to the present invention, it is preferable that a center distance of the material-supplying pipes be set to a difference (D−d) when D is a diameter of the duct and "d" is a diameter of the material-supplying pipes.

A cement production apparatus (corresponding to a second embodiment in DETAILED DESCRIPTION OF THE INVENTION stated below) according to the present invention includes: a plurality of cyclones vertically connected to each other in which exhaust gas generated in a cement kiln flows; a duct provided between the two upper cyclones and the lower cyclone being arranged below the upper cyclones, the duct in which the exhaust gas drained from the lower cyclone flows upward, distributing and introducing the exhaust gas to the upper cyclones; material-supplying pipes for supplying cement raw material connected to vertically separated positions of a side surface of the duct below a distribution part among the upper cyclones; and a supply-amount controller provided on an upstream position above the material-supplying pipes for controlling supply-amounts of the cement raw material: and when "h" is a center distance between connecting ports of the material-supplying pipes and D is a diameter of the duct, a ratio h/D is set to 0.4 to 1.3.

By arranging the connecting ports of the material-supplying pipes at the vertically separated positions of the side surface and setting the ratio h/D to 0.4 to 1.3, the connecting ports of the material-supplying pipes can be arranged at positions corresponding to the swirl flows generated in the duct.

On the upstream position above the material-supplying pipes, the supply-amount controller for controlling the supply-amounts of the cement raw material is provided, so that deviation of the material supply-amounts can be calibrated by the supply-amount controller. Accordingly, the supply-amounts of the cement raw material supplied to the material-supplying pipes can be controlled. Therefore, the cement raw material can be supplied to the respective swirl flows with controlling so that temperatures of the distribution outlets are equalized and the pre-heating can be equalized. Moreover, since the connecting ports of the material-supplying pipes are arranged at the vertically separated positions on the side surface, it is easy to lay the material-supplying pipes.

If the ratio h/D is less than 0.4, the connecting ports are too close to each other; therefore it is difficult to dispose the connecting ports of the material-supplying pipes at the positions corresponding to the respective swirl flows. As a result, even if the supply-amounts are controlled by the supply-amount controller, it is difficult to pre-heat the cement raw material equally. Furthermore, if the ratio h/D is more than 1.3, it is not desirable since the cement raw material from the upper and lower material-supplying pipes are carried by one swirl flow, so that material distribution-amounts at the distribution outlets are biased.

In the cement production apparatus according to the present invention, it is preferable that the material-supplying pipes be inclined by an angle of 20° to 50° with respect to an axis of the duct.

Furthermore, it is preferable that the connecting ports of the material-supplying pipes be flush with an inner wall surface of the duct.

Effects of the Invention

According to the present invention, it is possible to pre-heat uniformly cement raw material supplied to cyclones above a duct, so that heat-exchanging efficiency can be improved. Moreover, since it is not necessary to provide dispersing plates and the like in the duct, it is possible to perform an operation with low pressure loss and small energy consumption.

DETAILED DESCRIPTION OF THE INVENTION

Below, embodiments of a cement production apparatus according to the present invention will be described with reference to the drawings.

Figure 4:
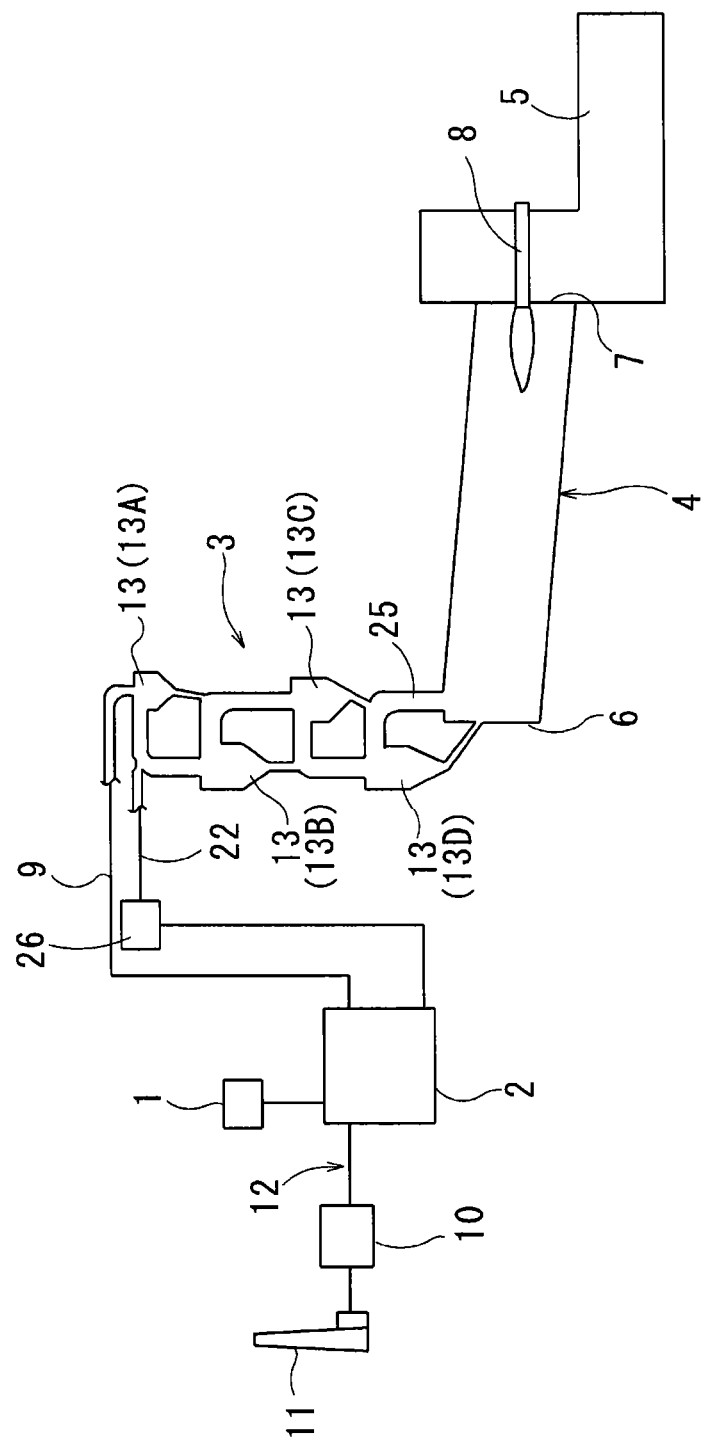
FIG. 4 It is a schematic block diagram generally showing the cement production apparatus.

As generally shown in FIG. 4, a cement production apparatus of a first embodiment is provided with: a material bunker 1 particularly storing limestone, clay, silica, ferrous material and the like as cement raw materials; a raw mill-and-dryer 2 milling and drying the cement raw materials; a preheater 3 pre-heating the powdery cement raw material obtained in the raw mill; a cement kiln 4 burning the cement raw material pre-heated by the preheater 3; a cooler 5 to cool cement clinker after burning in the cement kiln 4, and the like.

The cement kiln 4 is a rotary kiln having a lateral-cylindrical shape slightly inclined, in which, by rotating around an axis, while carrying the cement raw material supplied from the preheater 3 to a kiln inlet part 6 to a kiln-outlet part 7, cement clinker is generated by heating and burning to about 1450° C. by a burner 8 in the kiln-outlet part 7 in the carrying process, and then the cement clinker is sent out to the cooler 5 from the kiln-outlet part 7. The cement clinker is cooled to prescribed temperature in the cooler 5, and sent to a finishing process.

Exhaust gas which is generated in the cement kiln 4 flows upward in the preheater 3 from a lower part, and then is introduced into the raw mill-and-dryer 2 through an exhaust pipe 9. By the exhaust gas being introduced from the cement kiln 4, the raw mill-and-dryer 2 grinds the cement raw material and dries simultaneously. The raw mill-and-dryer 2 is connected to an exhaust-gas line 12 having a dust collector 10, a chimney 11 and the like.

The preheater 3 is constructed by vertically connecting a plurality of cyclones 13 in which the exhaust gas generated in the cement kiln 4 flows therein. A cyclone 13D which is a lowest part of the preheater 3 is connected to the kiln inlet part 6 of the cement kiln 4.

Figure 3:
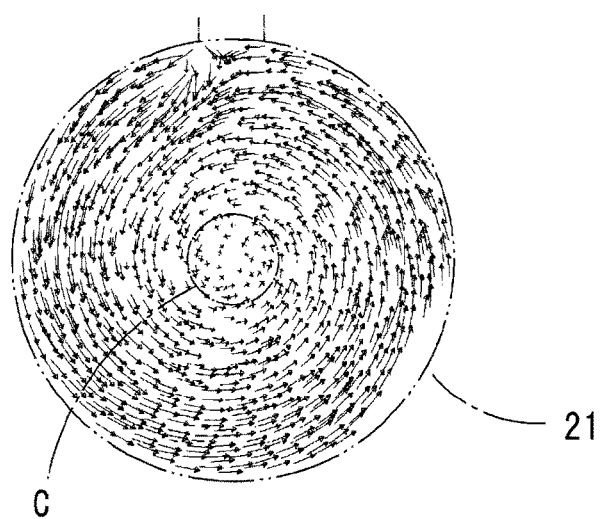
FIG. 3 It is a schematic view showing velocity vectors of a gas flow in a horizontal sectional view in the duct.

In FIG. 3, the structure of the preheater 3 is simply illustrated. The preheater 3 of the present embodiment is constructed from the cyclones 13 of four vertical stages. In this case, with respect to one cyclone 13B of a third stage, two cyclones 13A of a fourth stage as a top stage (that is to say upper cyclones in the present invention) are connected in parallel. By providing two cyclones 13B of the third stage in parallel, the cyclones 13A of the top stage are provided by four in total, two to each. The preheater 3 may be made from a different structure from the above-mentioned structure.

Figure 1:
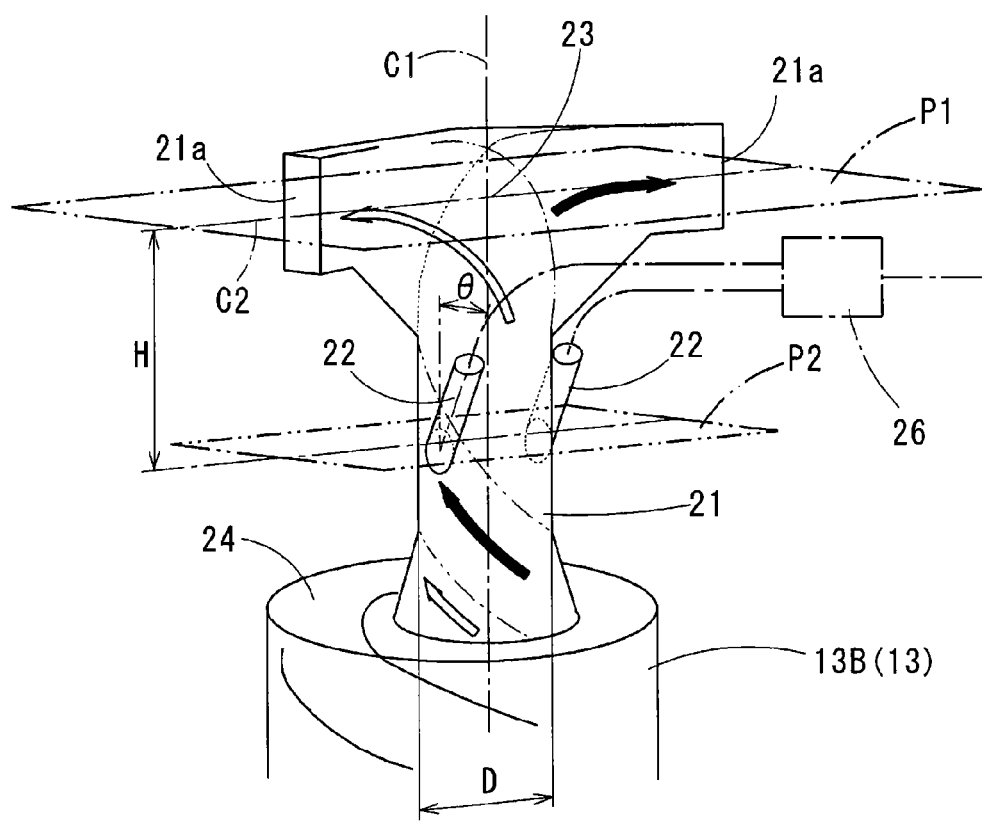
FIG. 1 It is a schematic view sterically showing a flow of exhaust gas in a duct in a first embodiment of a cement production apparatus according to the present invention.

A duct 21 of the preheater 3 connects the cyclones 13A of the top stage which are arranged by two with one of the cyclones 13B of the third stage. To the duct 21, a material-supplying pipes 22 to which the material is supplied from the raw mill-and-dryer 2 are connected. The duct 21 is extended vertically upward from the cyclone 13B of the third stage, and then branched to left-and-right through a distribution part 23, so that distribution outlets 21a are connected to two upper cyclones 13A respectively. In FIG. 1, the lower cyclone 13B alone is illustrated, the duct 21 is illustrated up to the distribution outlets 21a, and the upper cyclone 13A is omitted.

Figure 2:
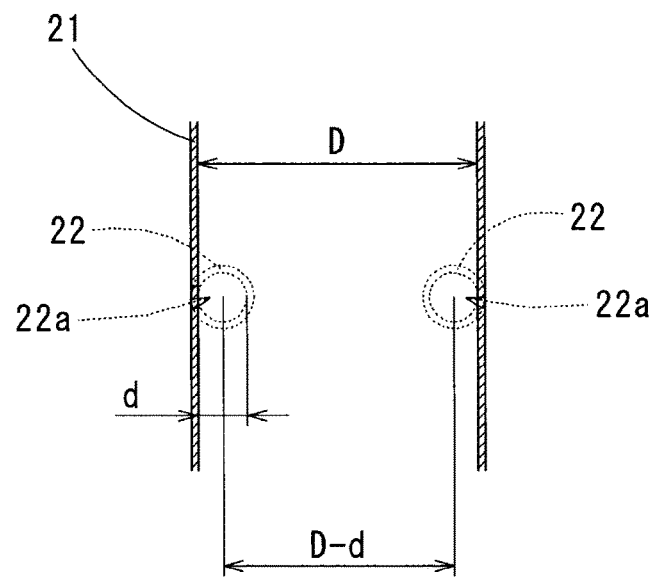
FIG. 2 It is a vertical sectional view showing a vicinity of connecting ports of material-supplying pipes.

Connection ports 22a of the material-supplying pipes 22 opening in the duct 21 are connected below the distribution part 23 of the duct 21, and provided by two as a same number as that of the distribution outlets 21a among the upper cyclones 13A. Connecting positions thereof are arranged at both side parts of a side surface of the duct 21 as shown in FIG. 1 and FIG. 2. A ratio H/D is set to 1.4 to 2.5 when H is a vertical distance between a horizontal surface P1 passing through centers of the distribution outlets 21 among the upper cyclones 13A and a horizontal surface P2 passing through centers of the connecting ports 22a of the material-supplying pipes 22 and D is a diameter of the duct 21.

As shown in FIG. 2, the material-supplying pipes 22 which are provided at both the side parts of the one side surface of the duct 21 are arranged so that a center distance thereof is set to a difference D−d between the diameter D of the duct 21 and a diameter "d" of the material-supplying pipes 22, in order to be separated at farthest from each other at the one side surface of the duct 21.

The connecting ports 22a of the material-supplying pipes 22 are flush with an inner wall surface of the duct 21. The material-supplying pipes 22 are inclined by a suitable angle θ of 20° to 50° with respect to an axis of the duct 21. The cement raw material is supplied with being fallen down through the material-supplying pipes 22. The material-supplying pipes 22 in FIG. 1 are provided to be parallel; however, it is not necessary to be parallel. The connecting ports 22a is not necessary to be flush with the inner wall surface of the duct 21, but may be slightly protruded from the inner wall surface of the duct 21.

A supply-amount controller 26 controlling supply-amounts of the cement raw material supplied to the material-supplying pipes 22 is provided in upper reaches above the material-supplying pipes 22. By the supply-amount controller 26, a structure is achieved so that the supply-amounts of the cement raw material supplied to the material-supplying pipes 22 are controlled and distributed to the material-supplying pipes 22 in order to uniformly pre-heat the cement raw material supplied to the distribution outlets 21a. The distribution part 23 is an intersection point at which the axis C1 of the duct 21 meets a line C2 linking centers of the distribution outlets 21a with each other to both the cyclones 13A of the upper stage (refer to FIG. 1).

In the cement production apparatus constructed as above, when the cement raw material is supplied from the material bunker 1, the cement raw material is milled and dried in the raw mill-and-dryer 2, charged in the preheater 3 from the material-supplying pipe 22, and then supplied to the lower cement kiln 4 while falling in the preheater 3. In the preheater 3, the exhaust gas from the cement kiln 4 flows upward sequentially in the cyclones 13 from the lower part in a counter direction to that of the cement raw material, so that the cement raw material is pre-heated by the exhaust gas from the cement kiln 4 while passing through the cyclones 13 to prescribed temperature (for example, 900° C.). The pre-heated cement raw material is supplied to the kiln inlet part 6 of the cement kiln 4 from the lowest cyclone 13D.

It will be further described to supply the cement raw material from the material-supplying pipes 22. In the duct 21 to which the material-supplying pipes 22 are connected, the exhaust gas rising from the cyclone 13B of the lower stage (the third stage) flows, so that the cement raw material is introduced into the cyclone 13A of the upper stage (a fourth stage) by being carried by the flow. Meanwhile, the exhaust gas generated by combustion in the cement kiln 4 rises inside the preheater 3 as a swirl flow by the cyclones 13. The cement raw material is supplied from the material-supplying pipes 22 and is dropped into the swirl flow.

As shown by velocity vectors in a horizontal cross sectional direction in FIG. 3, the swirl flow has large velocity vectors of a circumferential direction in the vicinity of the inner wall surface 21b of the duct 21; and as it approaches a center C of the duct 21, constituents of the circumferential direction becomes small and vertically-upward velocity vectors become large.

As shown in a schematic view shown in FIG. 1, the swirl flow flows from the lower cyclone 13B via the duct 21, is distributed into two at the distribution part 23, and flows into two cyclones 13A of the upper stage respectively. One flow into one of the two cyclones 13A is illustrated by black arrows, and one flow into the other cyclone is illustrated by white arrows by outlines. In the duct 21, those rise spirally while twisted. Finally, arriving at the distribution part 23 after rising in the duct 21, those are introduced into the cyclones 13A from the distribution outlets 21a respectively in a state of being branched from the distribution part 23. As described above, since two flows are the swirl flows spirally rising inside the duct 21, if the cement raw material is dropped to only one flow of them, it is supplied mostly to only one of the two cyclones 13A of the upper stage. As a result, a load is increased only in the one cyclone 13A.

In the horizontal surface P2 passing through the centers of the connecting ports 22 of the material-supplying pipes 22 in which the ratio H/D between the vertical distance H and the diameter D of the duct 21 is set to 1.4 to 2.5, when seeing from above the duct 21, the flow of the exhaust gas flowing out to the distribution outlets 21 among the upper cyclones 13A forms symmetrical swirl flows by 180° at a center part of the duct 21. Accordingly, by providing the connecting ports 22a of the material-supplying pipes 22 on both the one side parts of the side surface of the duct 21, the connecting ports 22a are arranged so as to be separated maximally from each other at the one side surface of the duct 21. As a result, the connecting ports 22a of the material-supplying pipes 22 can be arranged at positions corresponding to the two swirl flows appearing in the duct 21.

The cement raw material supplied from the one material-supplying pipes 22 among the material-supplying pipes 22 provided on the one side surface of the duct 21 is supplied along the swirl flow (in a parallel-flow side); meanwhile, the cement raw material supplied from the other material-supplying pipe 22 is supplied against the swirl flow (in a counter-flow side). The cement raw material in the parallel-flow side along the swirl flow can be supplied on the swirl flow; meanwhile, the cement raw material in the counter-flow side against the swirl flow can be supplied on the swirl flow since the swirl flow is strong, though colliding with the swirl flow. Therefore, the material dropped from the material-supplying pipes 22 is supplied to both the upper cyclones 13A from the distribution part 23 with being carried upward with the swirl flows.

On the upstream position above the material-supplying pipes 22, the supply-amount controller 26 is provided for controlling the supply-amounts of the cement raw material to the material-supplying pipes 22, so that deviation of the material supply-amounts can be calibrated by the supply-amount controller 26. Accordingly, the supply-amounts of the cement raw material supplied to the material-supplying pipes 22 are controlled and distributed to the material-supplying pipes 22 so as to equalize temperatures of the cement raw material supplied to the distribution outlets 21a. Therefore, the cement raw material can be supplied to the respective swirl flows with controlling, so that the cement raw material supplied to the distribution outlets 21a can be pre-heated uniformly.

As a result, respective pre-heating states of the cement raw material supplied to the cyclones can be equalized, so that the loads of both the cyclones are balanced. When gas-temperature difference between outlets of the cyclones of the top stage of the preheater exceeds 100° C. for example, a heat-consumption rate is increased at least 3 kcal/kg-cli or more. By equalizing the pre-heating states as in the apparatus of the present invention, the temperature difference is decreased so that the heat-consumption rate can be reduced. Furthermore, since the connecting ports 22a of the material-supplying pipes 22 are provided to be flush with the inner wall surface of the duct 21, there is no resistance against the swirl flows rising from below, and it is possible to perform an operation with low pressure loss and small energy consumption.

By providing the connecting ports 22a on the one side surface of the duct 21, the material-supplying pipes 22 can be disposed from the one side of the duct 21, so that it is easy to lay the material-supplying pipes.

If the ratio H/D is too small, it is not desirable because dispersibility of material is deteriorated since the connecting ports 22a of the material-supplying pipes 22 approach a distribution part 23 to the upper cyclones 13A. If the ratio H/D is too large, the heat-exchanging efficiency between the exhaust gas and the material is deteriorated since the material supplied from the material-supplying pipes 22 is dropped to the lower cyclone 13. Therefore, it is preferable to set the ratio H/D in a range of 1.4 to 2.5.

Figure 5:
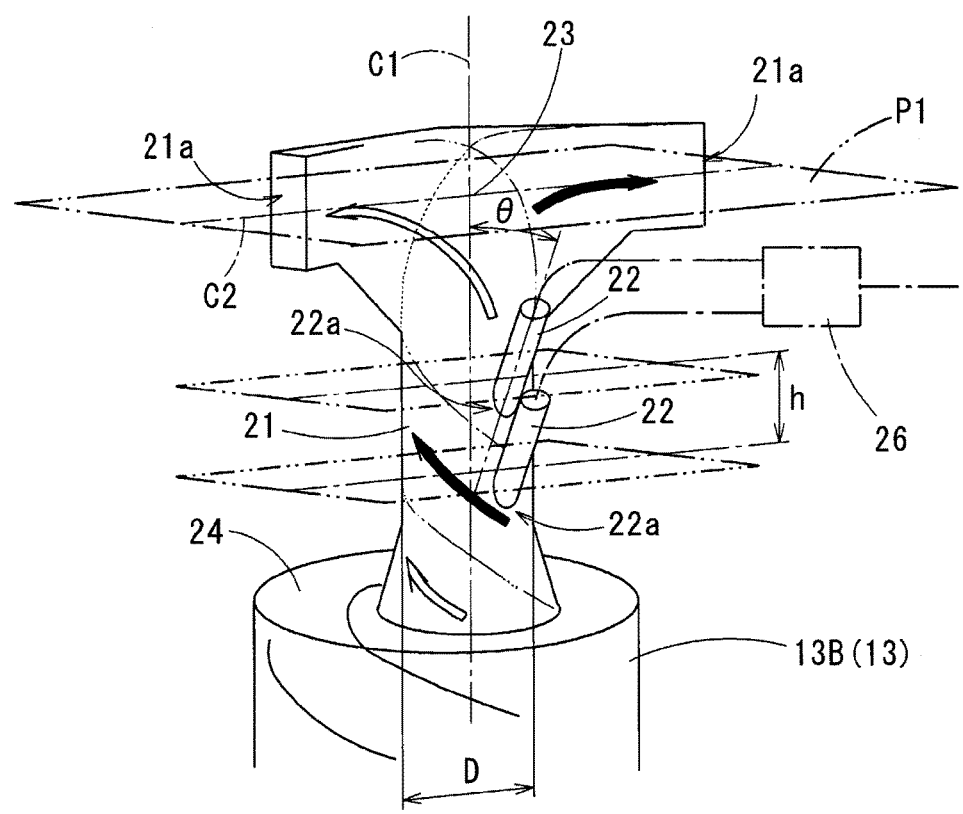
FIG. 5 It is a schematic view sterically showing a flow of exhaust gas in a duct in a second embodiment of a cement production apparatus according to the present invention.

Next, FIG. 5 shows a second embodiment of a cement production apparatus according to the present invention. The cement production apparatus shown in FIG. 5 includes: the connecting ports 22a of the material-supplying pipes 22 respectively connected to vertically separated positions of the one side surface of the duct 21 below the distribution part 23 among the upper cyclones 13A; and the supply-amount controller 26 provided on the upstream position above the material-supplying pipes for controlling the supply-amounts of the cement raw material to the material-supplying pipes 22. A ratio h/D is set to 0.4 to 1.3 when "h" is a center distance between connecting ports 22a of the material-supplying pipes 22 and D is a diameter of the duct 21.

In this case, by arranging the connecting ports 22a of the material-supplying pipes 22 to be vertically separated on the one side surface of the duct 21 and setting the ratio h/D to 0.4 to 1.3, the connecting ports 22a of the material-supplying pipes 22 can be arranged at positions corresponding to the swirl flows generated in the duct 21.

On the upstream position above the material-supplying pipes 22, the supply-amount controller 26 for controlling the supply-amounts of the cement raw material to the material-supplying pipes 22 is provided, so that deviation of the material supply-amounts can be calibrated by the supply-amount controller 26 and the supply-amounts of the cement raw material supplied to the material-supplying pipes 22 can be controlled. Accordingly, the cement raw material supplied to the respective swirl flows with controlling so that temperatures of the cement raw material supplied to the distribution outlets 21a can be equalized and the pre-heating can be equalized. Moreover, since the connecting ports 22a of the material-supplying pipes 22a are arranged at the vertically separated positions on the one side surface, it is easy to lay the material-supplying pipes 22.

If the ratio h/D is less than 0.4, the connecting ports 22a are too close to each other, so that it may be difficult to dispose the connecting ports 22a of the material-supplying pipes 22 at the positions corresponding to the swirl flows. As a result, even if the distribution-amounts are controlled by the supply-amount controller, it may be difficult to pre-heat the cement raw material equally. Furthermore, if the ratio h/D exceeds 1.3, it is not desirable since the cement raw material from the upper and lower material-supplying pipes 22 are carried by the one swirl flow, so that material distribution-amounts at the distribution outlets 21a tend to be biased.

Next, by simulating where the connecting ports of the material-supplying pipes should be arranged in order to drop the cement raw material into the two swirl flows, following results were obtained.

A duct model in simulation was set to have the distribution outlets 21a to the top cyclones: as shown in FIG. 1, a duct model 1 was configured to have the connecting ports 22a of the material-supplying pipes 22 at both the side parts of the one side surface of the duct 21. In the duct model 1, four types of the duct models were configured to have the ratio H/D as 1.45, 1.88, 2.26, and 2.64 respectively, in which H was the vertical distance between the horizontal surface P1 passing through the centers of the distribution outlets 21a of the upper cyclones and the horizontal surface P2 passing through the centers of the connecting ports 22a of the material-supplying pipes 22 and D was the diameter of the duct 21; and thermal fluid simulation was performed for those ducts. The supply-amounts of the cement raw material to the material-supplying pipes 22 (material supply-amount control ratio) were set equally. By calculating temperatures at the left-and-right distribution outlets of the duct after flowing through the distribution part, temperature differences thereof were obtained.

As conditions of the simulation, a preheater in a cement kiln had an amount of production of clinker 200 ton/h. In this preheater, to a third cyclone, gas was supplied with gas volume of 14300 Nm³/h and temperature of 640° C.; and to the material-supplying pipe, gas was supplied with gas volume of 1400 Nm³/h and temperature of 80° C. An inclined angle θ of the material-supplying pipes 22 in the duct model 1 was set to 35°.

Figure 6:
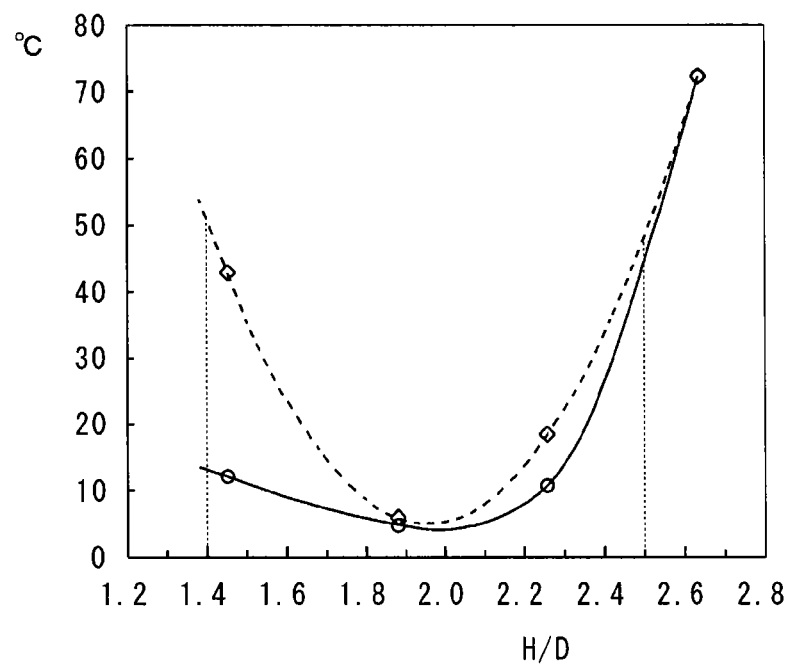
FIG. 6 It is a graph showing an analysis result of a relationship between temperature difference of exhaust gases at distribution outlets and a ratio H/D in which a vertical distance from a plane including a distribution part to tip ends of the material-supplying pipes with respect to an inner diameter of the duct.

Results of simulating the duct model 1 are shown in Table 1 and FIG. 6 by broken lines. A vertical axis in FIG. 6 is temperature difference between the exhaust gases at the left-and-right distribution outlets.

TABLE 1

| RATIO H/D | TEMPERTURE DIFFERENCE AT DISTRIBUTION OUTLETS (° C.) | MATERIAL SUPPLY-AMOUNT RATIO (%) | |
|---|---|---|---|
| | | RIGHT | LEFT |
| 1.45 | 43.0 | 50 | 50 |
| 1.88 | 6.0 | 50 | 50 |
| 2.26 | 18.5 | 50 | 50 |
| 2.64 | 72.4 | 50 | 50 |

As clear from the results shown in Table 1 and FIG. 6, in a case in which the connecting ports of the material-supplying pipes were arranged at both the side parts of the one side surface of the duct, temperature differences between the exhaust gas at the left-and-right distribution outlets can be reduced by arranging the connecting ports of the material-supplying pipes at positions in which the ratio H/D is set to 1.4 to 2.5.

Next, with respect to the above-mentioned duct model 1, thermal fluid simulation was operated by controlling the supply-amounts of the cement raw material distributed to the material-supplying pipes 22 (material supply-amount ratio) so as to minimize the temperature difference between the exhaust gases at the distribution outlets, and the material supply-amount ratio was optimized. Results of simulating were shown in Table 2 and FIG. 6 by solid lines.

TABLE 2

| RATIO H/D | TEMPERTURE DIFFERENCE AT DISTRIBUTION OUTLETS (° C.) | MATERIAL SUPPLY-AMOUNT RATIO (%) | |
|---|---|---|---|
| | | RIGHT | LEFT |
| 1.45 | 12.1 | 10 | 90 |
| 1.88 | 4.8 | 47 | 53 |
| 2.26 | 10.9 | 81 | 19 |
| 2.64 | 72.4 | 50 | 50 |

As clear from the results shown in Table 2 and FIG. 6, by controlling the supply-amounts of the cement raw material supplied to the material-supplying pipes, the temperature difference between the exhaust gases at the left-and-right distribution outlets can be reduced to substantially 50° C. or less, so that the pre-heating state of the cement raw material can be uniformed. Furthermore, when the ratio H/D is set to 1.7 to 2.2, the temperature difference between the exhaust gases at the left-and-right distribution outlets can be reduced to 10° C. or less.

Next, as shown in FIG. 5, a duct model 2 was configured to have distribution outlets 21a to the top cyclones at a vertically separated positions on the one side surface of the duct 21; and thermal fluid simulation was performed.

In the duct model 2, five types of the duct models were configured to have the ratio h/D as 0.25, 0.38, 0.76, 1.14, and 1.52 respectively, so that the thermal fluid simulation of the duct models were carried out: "h" is the center distance of the connecting ports 22a of the material-supplying pipes 22, and D is the diameter of the duct 21. The supply-amounts of the cement raw material to the material-supplying pipes 22 (material supply-amount ratio) were set equally. Conditions of the simulation were set as that of the duct model 1. An inclined angle θ of the material-supplying pipes 22 in the duct model 2 was also set to 35°.

Figure 7:
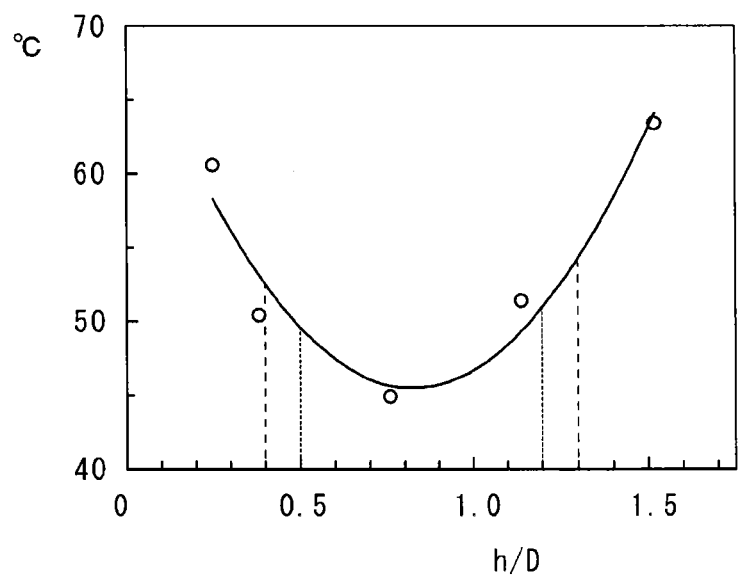
FIG. 7 It is a graph showing an analysis result of a relationship between temperature difference of exhaust gases at distribution outlets and a ratio h/D in which a center distance of the connecting ports of the material-supplying pipes with respect to the diameter of the duct.

Results of the duct model 2 were shown in Table 3 and FIG. 7. A vertical axis in FIG. 7 was temperature difference between the exhaust gases at the left-and-right distribution outlets.

TABLE 3

| RATIO | TEMPERTURE DIFFERENCE AT DISTRIBUTION OUTLETS | MATERIAL SUPPLY-AMOUNT RATIO (%) | |
|---|---|---|---|
| h/D | (° C.) | RIGHT | LEFT |
| 0.25 | 60.6 | 50 | 50 |
| 0.38 | 50.4 | 50 | 50 |
| 0.76 | 44.9 | 50 | 50 |
| 1.14 | 51.4 | 50 | 50 |
| 1.52 | 63.4 | 50 | 50 |

As clear from the results shown in Table 3 and FIG. 7, in a case in which the connecting ports of the material-supplying pipes were arranged vertically separated at the one side surface of the duct, temperature difference between the exhaust gases at the left-and-right distribution outlets can be reduced by arranging the connecting ports of the material-supplying pipes at positions in which the ratio h/D is set to 0.4 to 1.3. Also in this case, it is conceivable that by controlling the supply-amounts of the cement raw material to the material-supplying pipes, the temperature difference between the exhaust gases at the left-and-right distribution outlets can be reduced. The ratio h/D is more preferably 0.5 to 1.2.

The present invention is not limited to the above-described embodiments and various modifications may be made without departing from the scope of the present invention.

For example, though it was explained to supply the material to the duct that was connected to the cyclone 13A of the top stage, the present invention can be employed for a case in which the material is supplied to the ducts to the cyclones which are provided in plural at each of the stages, or to a rising duct 25 (refer to FIG. 4) connecting the lowest cyclone 13D and the kiln inlet part 6 of the cement kiln.

Moreover, the present invention can be employed not only for supplying raw material sent from a mill as cement raw material, but also for a case for supplying material while being introduced to the lower cyclone with being pre-heated after flowing through the upper cyclone.

INDUSTRIAL APPLICABILITY

It can be applied for a cement production apparatus that produces cement clinker by burning cement raw material in a kiln while supplying to a preheater.

DESCRIPTION OF REFERENCE SYMBOLS 3 preheater
4 cement kiln
6 kiln inlet part
13, 13A to 13D cyclone
21 duct
21b inner wall surface
22 material-supplying pipe
23 distribution part
24 upper end
25 rising duct
26 supply-amount controller

What is claimed is:

1. A cement production apparatus comprising:
a plurality of cyclones vertically connected to each other in which exhaust gas generated in a cement kiln flows;
a duct provided between two upper cyclones and a lower cyclone being arranged below the upper cyclones, the duct in which the exhaust gas drained from the lower cyclone flows upward, distributing and introducing the exhaust gas to the upper cyclones;
material-supplying pipes to supply cement raw material, each of the material-supplying pipes connected to a corresponding side part of the duct below a distribution part among the upper cyclones; and
a supply-amount controller provided on an upstream position above the material-supplying pipes to control supply-amounts of the cement raw material to the material-supplying pipes,
wherein H is a vertical distance between a horizontal surface passing through centers of distribution outlets of the upper cyclones and a horizontal surface passing through centers of connecting ports of the material-supplying pipes, D is a diameter of the duct, and a ratio H/D is set to 1.4 to 2.5.

2. A cement production apparatus comprising:
a plurality of cyclones vertically connected to each other in which exhaust gas generated in a cement kiln flows;
a duct provided between two upper cyclones and lower cyclone being arranged below the upper cyclones, the duct in which the exhaust gas drained from the lower cyclone flows upward, distributing and introducing the exhaust gas to the upper cyclones;
material-supplying pipes to supply cement raw material connected to vertically separated positions of a side surface of the duct below a distribution part among the upper cyclones; and
a supply-amount controller provided on an upstream position above the material-supplying pipes configured to control supply amounts of the cement raw material,
wherein h is a distance between centers of connecting ports of the material-supplying pipes and D is a diameter of the duct, and a ratio h/D is set to 0.4 to 1.3.

3. The cement production apparatus according to claim 1, wherein a distance between centers of the material-supplying pipes is equal to D–d where D is a diameter of the duct and d is a diameter of the material-supplying pipes.

4. The cement production apparatus according to claim 1, wherein the material-supplying pipes are inclined by an angle of 20° to 50° with respect to an axis of the duct.

5. The cement production apparatus according to claim 1, wherein the connecting ports of the material-supplying pipes are flush with an inner wall surface of the duct.

6. The cement production apparatus according to claim 2, wherein the material-supplying pipes are inclined by an angle of 20° to 50° with respect to an axis of the duct.

7. The cement production apparatus according to claim 2, wherein the connecting ports of the material-supplying pipes are flush with an inner wall surface of the duct.

8. The cement production apparatus according to claim 1, wherein the material-supplying pipes are oriented in a substantially parallel manner with one another.

\* \* \* \* \*